United States Patent
Kato et al.

[11] Patent Number: 5,992,867
[45] Date of Patent: *Nov. 30, 1999

[54] SUSPENSION ARM

[75] Inventors: Yoshihisa Kato; Kazuhito Imaizumi, both of Aichi-ken, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/698,125

[22] Filed: Aug. 15, 1996

[30] Foreign Application Priority Data

Aug. 30, 1995 [JP] Japan ................................... 7-222223
Jan. 22, 1996 [JP] Japan ................................... 8-008440

[51] Int. Cl.⁶ ................................................. B60G 7/00
[52] U.S. Cl. .......................... 280/124.134; 280/124.15; 29/897.2
[58] Field of Search ...................... 280/124.134, 124.15; 29/897.2

[56] References Cited

U.S. PATENT DOCUMENTS

| | | | |
|---|---|---|---|
| 2,215,967 | 9/1940 | Leighton | 403/114 |
| 2,274,417 | 2/1942 | Katcher | 403/226 |
| 2,611,625 | 9/1952 | Kishline et al. | 280/124.109 |
| 3,797,852 | 3/1974 | Patterson et al. | 280/124.151 |
| 5,169,055 | 12/1992 | Peterson et al. | 29/897.2 |
| 5,280,945 | 1/1994 | Delbeke | 280/673 |
| 5,516,129 | 5/1996 | Kurosu et al. | 280/96.1 |
| 5,556,119 | 9/1996 | Buchner et al. | 280/690 |
| 5,607,177 | 3/1997 | Kato | 280/673 |

FOREIGN PATENT DOCUMENTS

| | | |
|---|---|---|
| A-546-609 | 6/1993 | European Pat. Off. . |
| A-1-149-615 | 12/1957 | France . |
| A-39-25-107 | 2/1990 | Germany . |
| A-43-30-103 | 3/1994 | Germany . |
| A-43-22-632 | 1/1995 | Germany . |
| A-195-22-916 | 1/1996 | Germany . |
| U-60-134919 | 9/1985 | Japan . |
| U-1-93108 | 6/1989 | Japan . |
| A-6-156032 | 6/1994 | Japan . |

*Primary Examiner*—Stephen M. Johnson
*Attorney, Agent, or Firm*—Oliff & Berridge, PLC

[57] ABSTRACT

A suspension arm whose required strength is relatively small and which improves efficiency of space utilization. The arm body of the lower arm of a front suspension has a C-shaped cross section which is open toward the bottom. The top face of the arm body is positioned under a load acting plane. The shear center of cross section of the arm body can be positioned substantially in the vicinity of the load acting plane. A torsion caused by an input load is reduced, so that the arm body has an excellent torsional rigidity. Since the load acting plane is located outside the arm body, a space provided outside the arm body can be increased accordingly. Further, since a required strength of the lower arm can be made smaller, the cross sectional area of the lower arm can be decreased. This decreases the distance between the closed end and the open end of the arm body, thereby providing a sufficiently large space outside the arm body with a resultant improved efficiency of space utilization. This increase in space is advantageous to the positional relationship between the lower arm and a steering gear.

19 Claims, 8 Drawing Sheets

SUSPENSION ARM

BACKGROUND OF THE INVENTION

1. Field of the Invention

The present invention relates to a suspension arm having an arm body of an open cross sectional configuration which is open in one direction.

2. Description of the Related Art

As shown in FIG. 14, in an L- or A-shaped suspension arm 100 which forms part of a suspension, the outer end thereof is supported to a wheel carrier side via a ball joint 102, and the corner and inner end thereof are supported to a vehicle body side via bushings 104 and 106, respectively, at the forward position and the backward position of the vehicle. An input load applied through the center (point D) of the ball joint 102 is borne at the center (point A) of the bushing 104 at the forward position of the vehicle as well as at the center (point B) of the bushing 106 at the backward position of the vehicle. Accordingly, the load acting plane P, in which an input load applied to the arm 100 acts, is defined by a plane including points D, A, and B.

The arm 100 is formed by welding together two press-worked plates as shown in FIGS. 8 and 9 or by pressing one plate such that it has an open cross sectional configuration which is open toward the bottom. The arm 100 is formed such that the load acting plane P is interposed between the upper and lower faces of the arm 100.

As shown in FIG. 11, in a front suspension, a steering gear 118 is disposed above and in the vicinity of the arm 100 serving as a lower arm of the front suspension. In order to obtain a sufficiently large engine room space and to make the front suspension compact, it is preferable that the steering gear 118 be disposed as close as possible to the arm 100 (that dimension L between the bottom face of the arm 100 and the steering gear 118 of FIG. 12 be reduced), thereby lowering the position of the steering gear 118. However, as shown in FIG. 8, it is necessary to maintain a predetermined clearance between a tie rod 120 and the arm 100, thereby limiting the closeness between the arm 100 and the steering gear 118. As mentioned above, the load acting plane P is interposed between the top and bottom faces of the arm 100. Therefore, the height of the arm 100 is relatively large, thus restricting the low-level disposition of the steering gear 118. This restricts the desired increase in engine room space and the desired attainment of a compact suspension.

The required clearance between the arm 100 and the steering gear 118 restricts the level of the top face of the arm 100. Also, since a required clearance must be maintained between the steering gear 118 and parts disposed within the engine room, the degree of freedom for the disposition of the top face of the arm 100 is relatively small.

Further, since the arm 100 must be located a predetermined height above the road surface, the position of the bottom face thereof is also restricted. Accordingly, the degree of freedom for the disposition of the bottom face of the arm 100 is also small.

In order to dispose the steering gear 118 as close as possible to the arm 100, the cross section of the arm 100 may be made flat, as shown in FIG. 9. However, so long as the top face of the arm 100 is located above the load acting plane P, the steering gear 118 cannot be disposed at a sufficiently low level.

In order to dispose the steering gear 118 at a sufficiently low level, the top face of the arm 100 may be brought under the load acting plane P. However, in this case, as shown in FIG. 13, the centroid G of cross section of the arm 100 and the shear center S of the arm 100 are located under the load acting plane P. This causes an increase in the offset OS from the load acting plane P of the centroid G and the shear center S as compared with the case where the load acting plane P is interposed between the top and bottom faces of the arm 100, resulting in an increased bending moment caused by an input load applied to the arm 100. As a result, the arm 100 tends to be easily twisted. This causes a strength disadvantage in the arm 100 and reduces the torsional rigidity of the arm 100, which is required for stable travel of a vehicle. To cope with this problem, the cross sectional area of the arm 100 must be increased through, for example, increasing the thickness of the arm 100.

A suspension arm having an open cross section as shown in FIG. 10 is disclosed in Japanese Utility Model Application Laid-Open (JP-U) No. 1-93108. The suspension arm of FIG. 10 has a simple and lightweight structure, but is still poor in efficiency of space utilization, because the load acting plane P is interposed between the upper face and lower end thereof.

In the arm 100 having an open cross sectional configuration, the shear center S can be positioned closer to the closed end thereof (the upper face thereof) as compared with an arm 100 having a closed cross sectional configuration.

SUMMARY OF THE INVENTION

The present invention has been accomplished in view of the above-mentioned problems and fact. An object of the present invention is to provide a suspension arm which is able to have a relatively small required strength and which improves efficiency of space utilization.

According to a first aspect of the present invention, a suspension arm has an arm body of an open cross sectional configuration which is open in one direction, and a load acting plane of the suspension arm corresponds to or exists outside a closed end of the arm body in the open cross sectional configuration.

According to a second aspect of the present invention, in the suspension arm according to the first aspect, a projecting portion is provided at the closed end of the arm body such that the projecting portion projects toward the outside of the arm.

According to a third aspect of the present invention, in the suspension arm according to the first aspect, a hole portion is provided in the closed end of the arm body and the circumferential edge of the hole portion is bent outwardly.

The above-mentioned structure allows the load acting plane of the suspension arm to be located in the vicinity of the shear center of the cross section of the arm body. Accordingly, torsion caused by an input load is reduced, resulting in the suspension arm having an excellent torsional rigidity.

Since the load acting plane of the suspension arm corresponds to or exists outside the closed end of the arm body in the open cross sectional configuration, a space provided outside the closed end of the arm body can be increased accordingly.

Further, because of an excellent torsional rigidity, a required strength of the suspension arm can be made smaller, so that the cross sectional area of the suspension arm can be decreased. This decreases the distance between the closed end and the open end of the suspension arm in the open cross sectional configuration, thereby providing a sufficiently large space outside the closed end of the arm body with a resultant improved efficiency of space utilization.

Since the centroid of cross section can be moved toward the load acting plane, the offset therebetween is reduced, resulting in a reduced bending moment being generated in the cross section due to an input load. This is also advantageous to the strength of the suspension arm.

For example, in the lower arm of the front suspension, as a result of positioning the top face of the arm body lower than the load acting plane, within the portion of the arm body located under the steering gear or throughout the entire arm body, the steering gear can be disposed as close as possible to the lower arm, thereby lowering the position of the steering gear. Thus, a sufficiently large engine room space can be obtained above the lower arm, and the front suspension can be made compact. Further, the degree of freedom of the relative displacement between the lower arm and the steering gear is increased.

The above-described suspension arm having the arm body of such an open cross sectional configuration is readily formed by pressing.

According to the second aspect, an outwardly bent projecting portion is formed on the closed end of the arm body, so that the centroid of cross section of the arm body can be brought closer toward the closed end of the arm body, i.e. toward the load acting plane. This improves the strength of the arm, mainly strength against bending.

For example, when the centroid of cross section of the lower arm is positioned higher than the load acting plane within the central portion of the lower arm, a force to cause an upward elastic deformation is generated in the central portion of the lower arm. As a result, a force to cause a downward deformation is suppressed within the lower arm as a whole, resulting in an increased strength with respect to deformation of the lower arm. Moreover, it is possible to prevent the rigidity of the lower arm from decreasing, which would otherwise occur due to a torsional elastic deformation of the lower arm.

According to the third aspect, the hole portion is provided in the closed end of the arm body while the circumferential edge of the hole portion is bent outwardly. This prevents the centroid of cross section and shear center of the arm body from shifting excessively toward the inside of the arm due to the existence of the hole portion, bringing an advantage to the structural strength of the arm.

In addition to the above-mentioned effect, in the case of the lower arm, for example, when the hole portion serving as a weight reducing hole is also used as a work hole for tightening a bolt, the outwardly bent circumferential edge of the weight reducing hole serves as a guide for the socket of a bolt tightening tool.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIGS. 1A, 1B, and 1C show a suspension arm according to a first embodiment of the present invention, wherein FIG. 1A is a plan view, FIG. 1B is a view as viewed from the front of a vehicle, and FIG. 1C is a view as viewed from the inside of the vehicle in the width direction of the vehicle;

DESCRIPTION OF THE PREFERRED EMBODIMENTS

A first embodiment of a suspension arm according to the present invention will now be described with reference to FIGS. 1A to 1C and FIG. 2.

Figure 1B:
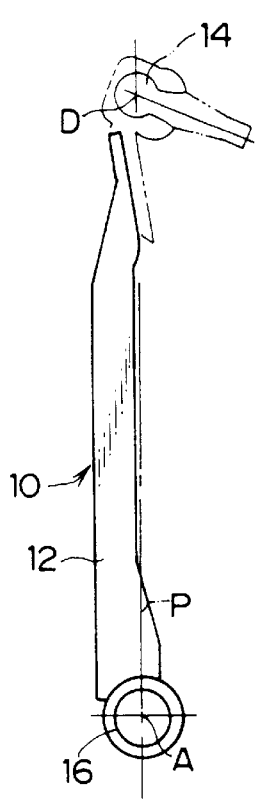
Figure 1A:
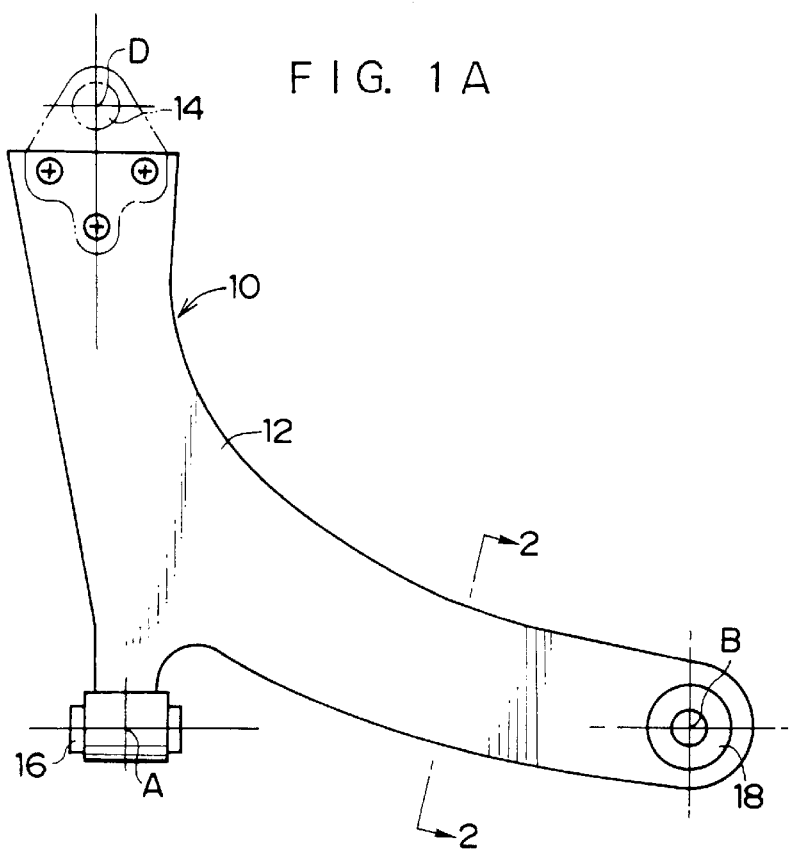
Figure 1C:
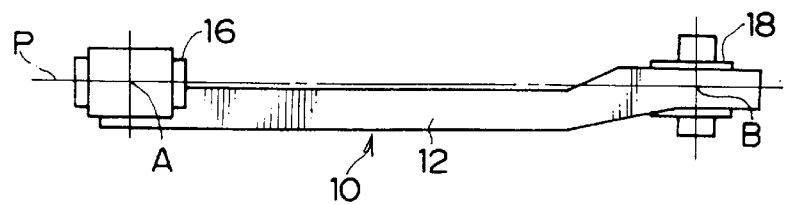

FIGS. 1A to 1C show a lower arm 10 (an arm serving as a suspension arm) of a front suspension. The arm 10 has an arm body 12 which is L-shaped as viewed in the vertical direction (see FIG. 1A). The one end of the arm body 12 is supported to a wheel carrier side via a ball joint 14. The one end is an end located at the outer side in the widthwise direction of a vehicle. The other end and the corner portion of the arm body 12 are supported to a vehicle body side via bushings 16 and 18, respectively. The other end and the corner portion are located at the inner side in the widthwise direction of the vehicle such that the other end is situated on the rear side of the corner portion in the longitudinal direction of the vehicle.

An input load applied through the center (point D) of the ball joint 14 is supported at the center (point A) of the bushing 16 at the forward position of the vehicle as well as at the center (point B) of the bushing 18 at the backward position of the vehicle. Accordingly, the load acting plane P (see FIGS. 1B and 1C), in which an input load applied to the lower arm 10 acts, is defined by a plane including points D, A, and B, namely, the load acting plane P is defined by including points in the arm where the load from outside of the arm extend.

Figure 2:
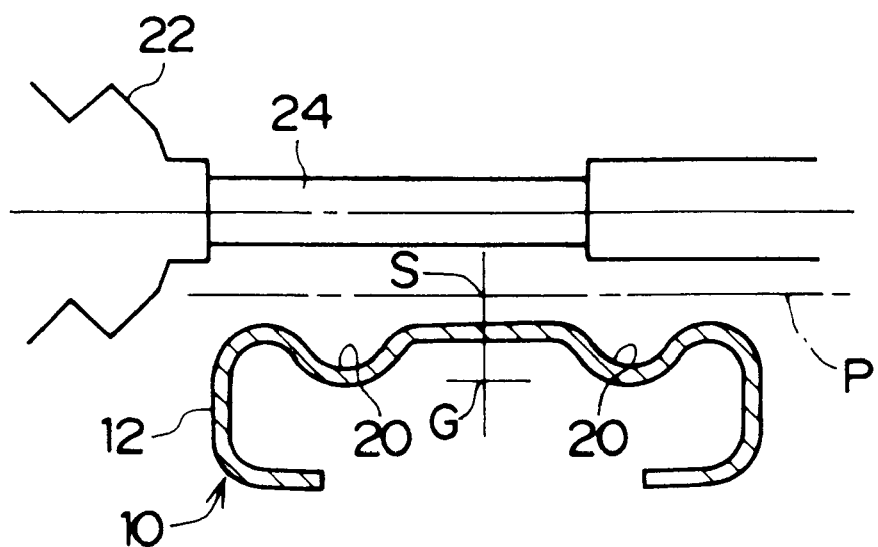
FIG. 2 is a cross section taken along line 2—2 of FIG. 1.

As shown in FIG. 2, the arm body 12 is formed by pressing one plate such that it has an open cross sectional configuration of a generally C-shape which is open toward the bottom. The top face of the arm body 12 is formed such that it is positioned under and in parallel with the load acting plane P.

A pair of depressions for forming reinforcing ribs 20 are provided at both sides of the top wall of the arm body 12 with spacing therebetween. This improves the vertical rigidity of the arm body 12.

In the above-described structure, the shear center S of cross section of the arm body 12 can be located in the vicinity of the load acting plane P outside the closed end of the arm portion 12 in the open cross sectional configuration. Accordingly, torsion caused by an input load is reduced, resulting in the arm body 12 having an excellent torsional rigidity. In other words, since the load acting plane P, on which an input load applied to the suspension arm acts, is located in proximity to the shear center S, which is a center of torsional deformation, the torsional deformation of the suspension arm is less likely to occur.

Since the load acting plane P is located outside the closed end of the arm body 12 in the open cross sectional configuration, a space provided outside the base portion of the arm body 12 can be increased accordingly. Further, since a torsion of the arm body 12 caused by an input load applied to the lower arm 10 is reduced, a required strength of the lower arm 10 can be made smaller, so that the cross sectional area of the lower arm 10 can be decreased. This decreases the distance between the closed end and the open end of the arm body in the open cross sectional configuration, thereby providing a sufficiently large space outside the closed end of the arm body with a resultant improved efficiency of space utilization.

Since the centroid G of cross section can be moved toward the load acting plane P (upward), a bending moment being generated in the cross section due to an input load is reduced. This is also advantageous to the strength of the lower arm 10.

In the lower arm 10 of the front suspension, as a result of positioning the top face of the arm body 12 lower than the load acting plane P, within at least the portion of the arm body 12 located under a steering gear 22 or throughout the entire arm body 12, the steering gear 22 can be disposed as close as possible to the lower arm 10 (while a predetermined clearance is maintained between a tie rod 24 and the arm body 12), thereby lowering the position of the steering gear 22. Thus, a sufficiently large engine room space can be obtained above the lower arm 10, and the front suspension can be made compact. Further, the degree of freedom of the relative displacement between the lower arm 10 and the steering gear 22 is increased.

The above-described suspension arm having the arm body 12 of such an open cross sectional configuration is readily formed by pressing.

In the arm body 12 described above, the portion having an open cross sectional configuration may be limited to the portion located under the steering gear 22 or may extend throughout the entire arm body 12.

The arm body of the present invention is not limited to the first embodiment described above. The arm body of the present invention may be embodied in various other forms, such as a first through fifth embodiments, which will be described below.

Figure 3:
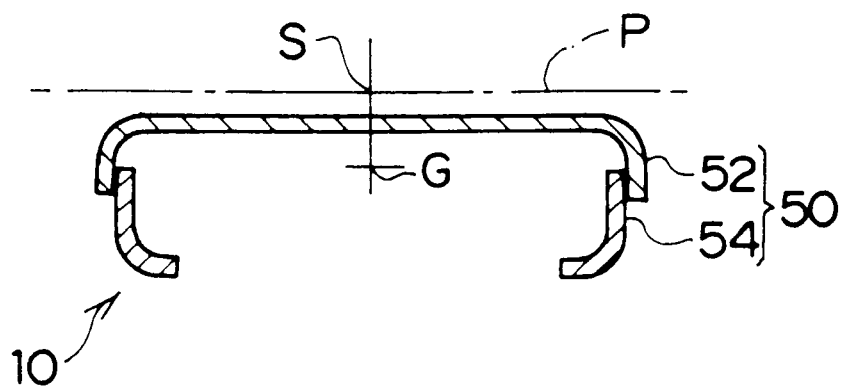
FIG. 3 is a cross section, corresponding to FIG. 2, of a suspension arm according to a second embodiment of the present invention.

As shown in FIG. 3, an arm body 50 according to the second embodiment of the present invention is composed of two press-worked plates, namely an arm upper 52 and an arm lower 54. The arm upper 52 is formed by pressing a plate such that it has a C-shaped cross section. The arm lower 54 is formed by pressing a plate such that it has a C-shaped cross section and then by forming an opening in the closed portion thereof. The side walls of the arm lower 54 located inside the side walls of the arm upper 52 overlap the side walls of the arm upper 52, and then welded along the overlapped portions. Thus, the arm upper 52 and the arm lower 54 are joined together. Since the bottom wall of the arm lower 54 has an opening, the arm body 50 has an open cross sectional configuration.

The present embodiment also provides effects similar to those of the first embodiment.

Since the arm body 50 is composed of two members, the degree of freedom of adjusting the position of the shear center S increases. The position of the shear center S is adjusted, for example, by changing the thicknesses of the arm upper 52 and the arm lower 54.

Figure 4:
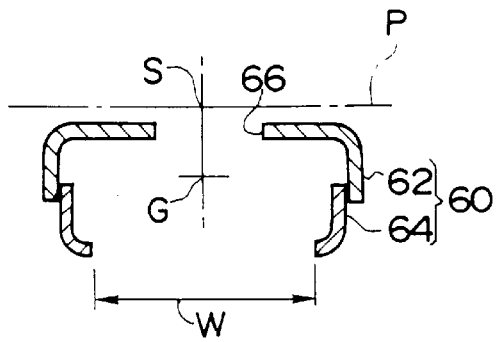
FIG. 4 is a cross section, corresponding to FIG. 2, of a suspension arm according to a third embodiment of the present invention.

As shown in FIG. 4, an arm body 60 according to the third embodiment of the present invention is also composed of two press-worked plates as in the arm body 50 according to the above-described second embodiment. Namely, the arm body 60 is composed of an arm upper 62 and an arm lower 64 which are welded. A weight reducing hole (hole portion) 66 is formed in the top face of the arm upper 62. In order that the arm body 60 as a whole has an open cross sectional configuration, the width W of an opening formed in the bottom wall of the arm lower 64 is relatively large with respect to the weight reducing hole 66. The opening in the bottom wall of the arm lower 64 functions to significantly shift the shear center S upward, and the weight reducing hole 66 functions to finely adjust the position of the shear center S (to prevent the shear center S from being positioned too high). Accordingly, it is possible to bring the shear center S closer to the load acting plane P and to shift the centroid G of cross section toward the load acting plane P, thereby more remarkedly obtaining the above-described effects of the first embodiment.

By making the arm lower 64 thinner than the arm upper 62, it is possible to bring the shear center S closer to the load acting plane P and to shift the centroid G of cross section toward the load acting plane P, thereby further enhancing the above-mentioned effects.

Figure 5:
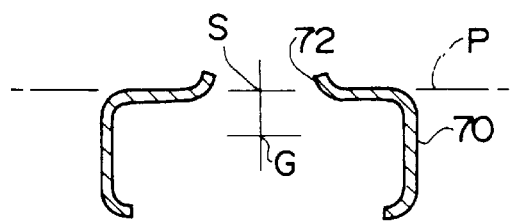
FIG. 5 is a cross section, corresponding to FIG. 2, of a suspension arm according to a fourth embodiment of the present invention.

As shown in FIG. 5, an arm body 70 according to the fourth embodiment of the present invention is composed of one press-worked plate having a C-shaped open sectional configuration which is open toward the bottom. A weight reducing hole (hole portion) 72 is formed in the top face of the arm body 70. The weight reducing hole 72 is burred so that the circumferential edge of the weight reducing hole 72 is bent toward the load acting plane P. With this structure, in addition to effects similar to those of the third embodiment described above, the burring of the weight reducing hole 72 makes it possible to shift toward the load acting plane P the shear center S and the centroid G of cross section while preventing them from positioning too low due to the weight reducing hole 72. The size of the weight reducing hole 72 can be minimized so long as a mounting bolt can be inserted therethrough when a sub-frame or the like is attached to a vehicle body. Thus, the arm body 70 can be formed without reducing the strength thereof and while maintaining a rigidity advantage.

The present embodiment also provides effects similar to those of the first embodiment.

Figure 6:
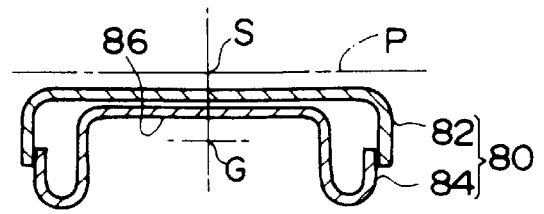
FIG. 6 is a cross section, corresponding to FIG. 2, of a suspension arm according to a fifth embodiment of the present invention.

As shown in FIG. 6, an arm body 80 according to the fifth embodiment of the present invention is composed of two press-worked plates as in the arm body 60 according to the third embodiment. Namely, the arm body 80 is composed of an arm upper 82 and an arm lower 84. However, the fifth embodiment is different from the third embodiment in the following. The arm upper 82 does not have a weight reducing hole in the top wall thereof. The arm lower 84 does not have an opening in the bottom wall thereof, but the center portion of the bottom wall is depressed toward the arm upper 82 (in FIG. 6, the depressed portion is denoted by reference numeral 86), whereby the arm body 80 as a whole has an open cross sectional configuration.

The present embodiment also provides effects similar to those of the first embodiment.

Since the arm body 80 has a substantially box-shaped cross section (closed cross section), the strength thereof is significantly increased.

Figure 7:
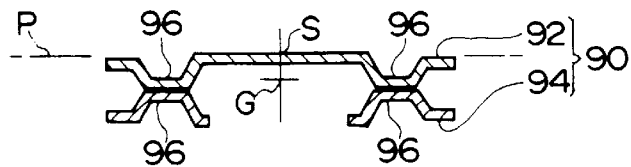
FIG. 7 is a cross section, corresponding to FIG. 2, of a suspension arm according to a sixth embodiment of the present invention.
Figure 8:
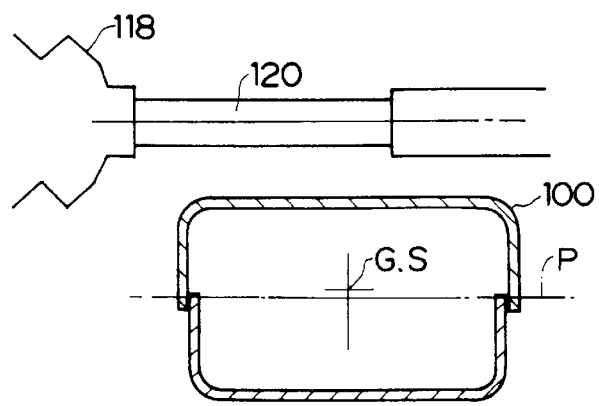
FIG. 8 is a cross section of a conventional suspension arm.
Figure 9:
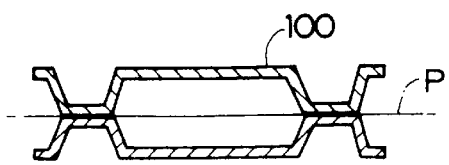
FIG. 9 is a cross section of a conventional suspension arm.
Figure 10:
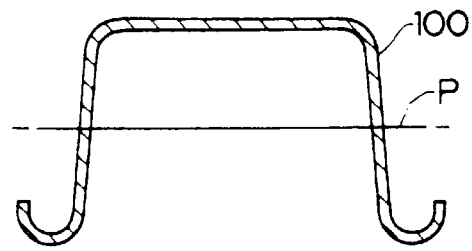
FIG. 10 is a cross section of a conventional suspension arm.

As shown in FIG. 7, an arm body 90 according to the sixth embodiment of the present invention is composed of two press-worked plates, namely an arm upper 92 and an arm lower 94. In each of the arm upper 92 and the arm lower 94, a pair of depressions for forming ribs 96 are provided at both sides with spacing between the ribs 96. The arm upper 92 and the arm lower 94 are welded together such that the projecting portion of the rib 96 of the arm upper 92 abuts that of the rib 96 of the arm lower 94, whereby the arm body 90 as a whole has a flat cross section. The arm lower 94 has an opening between the ribs 96 so that the arm body 90 as a whole has an open cross sectional configuration. As a result, the top face of the arm upper 92 (the top face of the arm body 90) and the load acting plane P are located in the vicinity of each other. The ribs 96 improves the vertical rigidity of the arm body 90. That is, since the cross section of the arm body 90 is near H-shaped, the strength of the arm body 90 with respect to deformation improves significantly.

Figure 15:
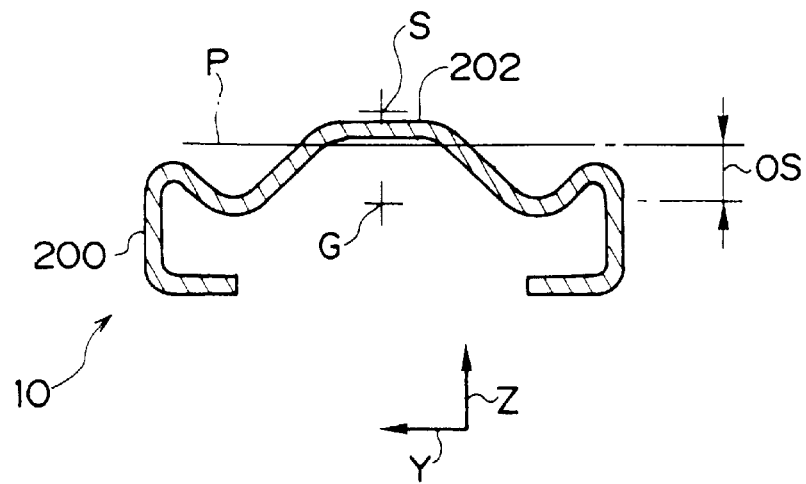
FIG. 15 is a cross section, corresponding to a cross section taken along line 15—15 of FIG. 18, of a suspension arm according to a seventh embodiment of the present invention.

The seventh embodiment of the present invention will now be described with reference to FIG. 15.

According to the present embodiment, as in the first embodiment, an arm body 200 of the lower arm 10 is formed of one press-worked plate. In the central portion of the lower arm 10 (which corresponds to the portion designated by symbol A in FIG. 18 and which is the central portion of the curved portion extending between the bushing 18 (to be connected to a vehicle body) and the ball joint 14 (to be connected to a wheel carrier)), a plateau-like portion (projecting portion) 202 is protrudingly formed on the top face of the arm body 200, as shown in FIG. 15. Other features of the cross section of the arm body 200 are similar to those of the first embodiment.

As described previously, a suspension arm having a flat open cross section which is open toward the bottom (in one direction) has a smaller torsional rigidity as compared with a suspension arm having a closed cross section. Therefore, by positioning the shear center S in proximity to the load acting plane P, the torsional elastic deformation of the suspension arm is reduced, thereby preventing the rigidity of the suspension arm from decreasing.

When a driver steps on a brake or a vehicle runs over a projection on a road surface, an input load directed backward in the longitudinal direction of the vehicle (an input load acting to pull the vehicle backward) is applied to the center (point D) of the ball joint 14. A suspension arm therefore must have a sufficient strength against the input load. However, due to the offset OS between the load acting plane P and the centroid G of cross section, i.e. due to the load acting plane P being positioned above the centroid G of cross section, a downward bending moment acts on the cross section of the lower arm 10. As a result, the lower arm 10 is likely to show a downwardly projecting deformation, which becomes the largest at its central portion, i.e. portion A of FIG. 18. This increases further the offset OS, resulting in a further increased deformation.

The section modulus of a flat cross section is large in the Y direction and small in the Z direction (in the upward direction). Accordingly, if a suspension arm has a structure which is less likely to deform in the opposite direction of the Z direction (in the downward direction), its strength with respect to deformation will improve.

According to the present embodiment, the plateau-like portion 202 functions to shift the centroid G of cross section upward, thereby reducing the offset OS. As a result, a bending moment acting on the cross section of the arm body 200 is reduced.

The eighth embodiment of the present invention will now be described with reference to FIG. 16.

According to the present embodiment, an arm body 150 of the lower arm 10 is formed of one press-worked plate as in the first embodiment. An opening is formed in the bottom wall of the arm body 150 opposite to the load acting plane P (i.e., the lower side is opened), and the shear center S is positioned in the vicinity of the load acting plane P, thereby suppressing the torsional elastic deformation of the lower arm 10.

Figure 16:
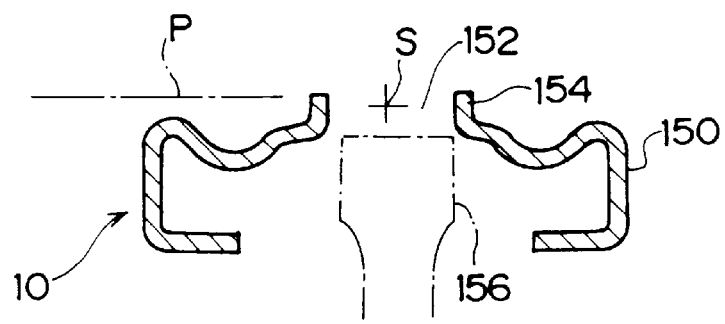
FIG. 16 is a cross section, corresponding to FIG. 15, of a suspension arm according to an eighth embodiment of the present invention.

As shown in FIG. 16, in the central portion of the lower arm 10, a weight reducing hole (hole portion) 152 is formed in the top face of the arm body 150. A circumferential edge 154 of the weight reducing hole 152 is bent outwardly (upward) and extends annularly and upwardly.

The weight reducing hole 152 is provided so as to reduce the weight of the lower arm 10. As described previously, as a result of the weight reducing hole 152 being formed, the shear center S of the cross section of the arm body 150 is positioned lower as compared with a case where no weight reducing hole is formed. If the shear center S is positioned too low due to the weight reducing hole 152 being formed, the strength and rigidity of the lower arm 10 will decrease.

This downward shift of the shear center S due to the weight reducing hole 152 being formed can be controlled by forming the outwardly bent circumferential edge 154 of the weight reducing hole 152. Thus, while the strength and rigidity of the lower arm 10 are maintained, the weight of the lower arm 10 can be reduced.

Figure 11:
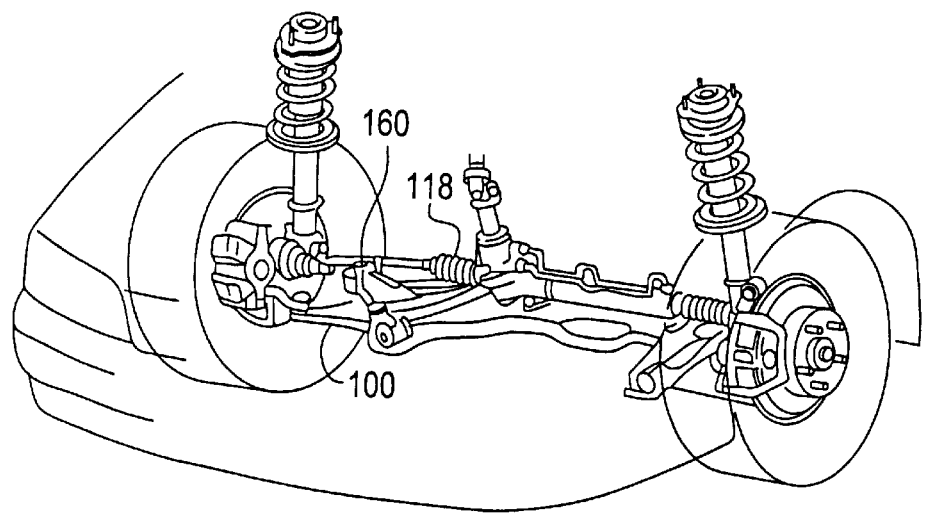
FIG. 11 is a perspective view showing a lower arm of a front suspension in a mounted state.
Figure 12:
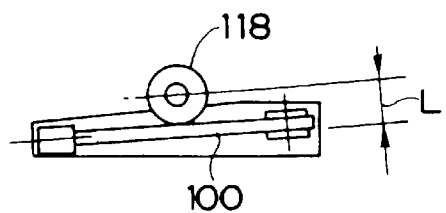
FIG. 12 is a view showing the relationship between the lower arm and the steering gear.
Figure 13:
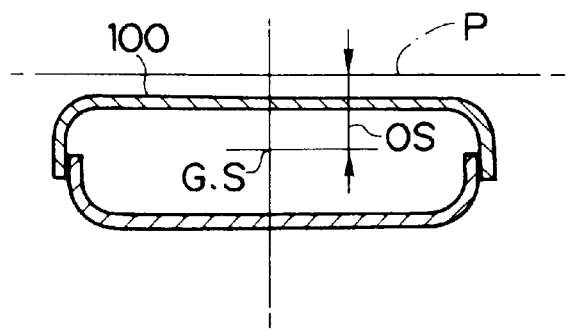
FIG. 13 is a cross section of a conventional suspension arm.
Figure 14:
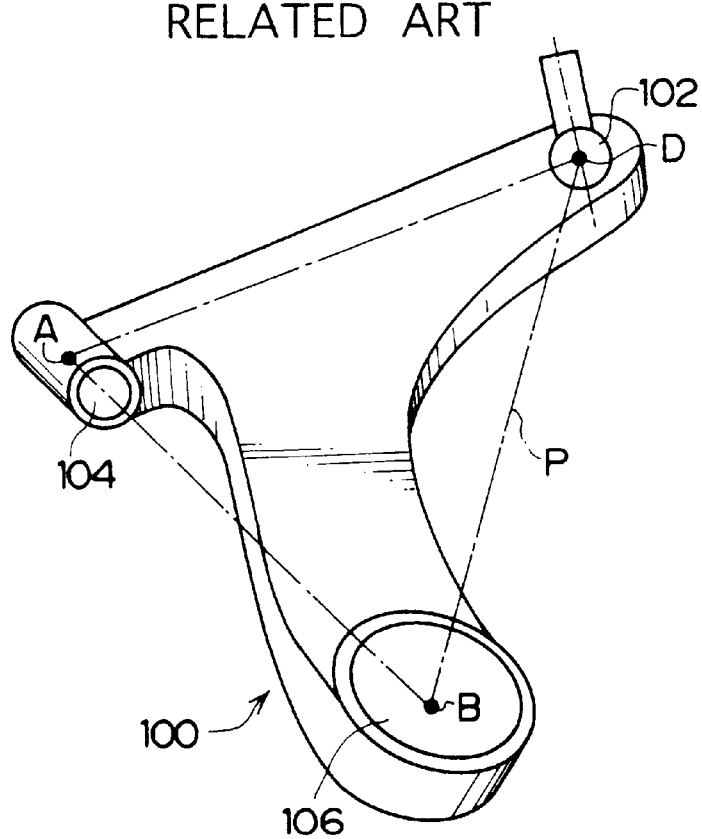
FIG. 14 is a perspective view of a suspension arm showing a load acting plane.

As mentioned in the description of the fourth embodiment, in some cases, a bolt receiving portion 160 (see FIG. 11) for receiving a bolt to secure a sub-frame to the vehicle body may be located above the central portion of the lower arm 10. In order to tighten the bolt into the bolt receiving portion 160, the lower arm 10 must have a hole for tightening work. When the weight reducing hole 152 is also used as a hole for tightening the bolt, the outwardly bent circumferential edge 154 of the weight reducing hole 152 serves as a guide for a tightening socket 156, which is inserted into the weight reducing hole 152 for tightening the bolt, thereby facilitating the work of tightening the bolt.

Figure 17:
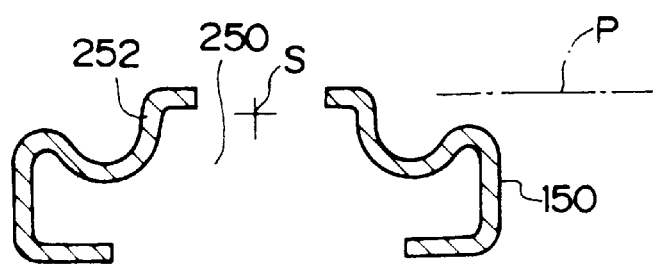
FIG. 17 is a cross section, corresponding to FIG. 15, of a suspension arm according to a ninth embodiment of the present invention.

Alternatively, the outwardly bent circumferential edge 154 of the weight reducing hole 152 may have a structure according to the ninth embodiment shown in FIG. 17.

According to the ninth embodiment, the circumferential edge 252 of the weight reducing hole 250 is bent outwardly and bent toward the center of the weight reducing hole 250 so as to reduce the diameter of the weight reducing hole 250.

The present embodiment also provides effects similar to those of the eighth embodiment.

The shape of the cross section of the arm body 150 according to the eighth and ninth embodiments is similar to that of the first embodiment except for the weight reducing holes 152 and 252.

The ninth embodiment as shown in FIG. 17 may be characterized as being formed into an open cross sectional configuration which is open in one direction, the cross sectional configuration including a first wall having a flat portion and ending at end portions, side walls extending in the one direction from each respective end portion of the first wall and ending at end portions, and second walls extending inwardly from each respective end portion of each side wall, the second walls extending toward each other. The first wall includes the weight reducing hold 250.

Figure 18:
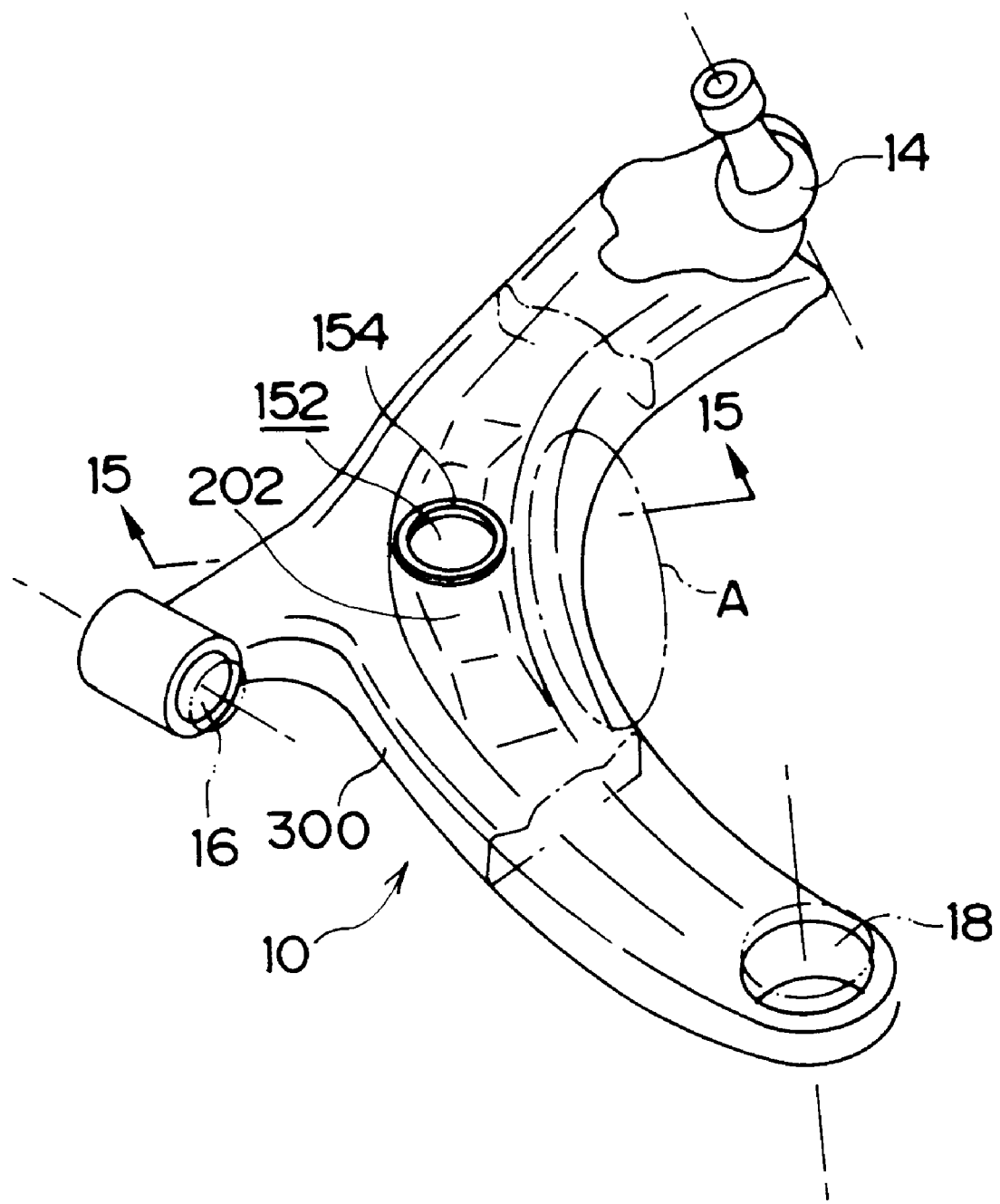
FIG. 18 is a perspective view of a suspension arm according to a tenth embodiment of the present invention.

According to the tenth embodiment of the present invention shown in FIG. 18, in the central portion of the lower arm 10, the plateau-like portion 202 according to the seventh embodiment is provided on an arm body 300, and the weight reducing hole 152 according to the eighth embodiment is formed in the top face of the plateau-like portion 202 while the circumferential edge 154 of the weight reducing hole 152 is outwardly bent. Thus, an effect derived from the plateau-like portion 202 and an effect derived from the outwardly bent circumferential edge 154 of the weight reducing hole 152, as described under the seventh and eighth embodiments, are both obtained.

Any of the seventh through tenth embodiments provides effects similar to those of the first embodiment so long as they have a structure similar to that of the first embodiment.

In every embodiment described above, the load acting plane P may be located outside the closed end of the arm body in the open cross sectional configuration or may correspond to the closed end of the arm body.

While the embodiments of the present invention, as herein disclosed, constitute a preferred form, it is to be understood that other forms might be adopted.

What is claimed is:

1. A suspension arm, comprising:
   an arm body having a first end, a second end, and an arm body portion connecting the first end and the second end, a portion of the arm body portion formed into an open cross sectional configuration which is open in one direction, the cross sectional configuration including a first wall having a flat portion and ending at end portions, side walls extending in the one direction from each respective end portion of the first wall and ending at end portions, and second walls extending inwardly from each respective end portion of each side wall, the second walls extending toward each other;
   a connection point at a wheel at the first end of the arm body;
   a connection point at a vehicle at the second end of the arm body; and
   a connection point at the vehicle connected to the arm body portion of the arm body;
   wherein said connection points define a load acting plane through which a load acts on said suspension arm, said load acting plane passes through the first wall of said arm body or exists in a direction opposite to the one direction from the first wall of said arm body.

2. A suspension arm according to claim 1, wherein said arm body is L-shaped as viewed in the vertical direction, and the first end of said arm body located at the outer side in the widthwise direction of a vehicle being supported to a wheel carrier side via a ball joint at the connection point at the wheel, while the second end and a corner portion of said arm body are supported to a vehicle body side via bushings at the connection points at the vehicle, respectively.

3. A suspension arm according to claim 1, wherein said arm body has the open cross sectional configuration of a substantially C-shape which is open in a downward direction.

4. A suspension arm according to claim 3, wherein a pair of depressions for forming reinforcing ribs are provided at both sides of the first wall of said arm body with spacing therebetween.

5. A suspension arm according to claim 3, wherein a weight reducing hole is formed in the first wall of said arm body, and said weight reducing hole is machined by burring so as to bend the circumferential edge of said weight reducing hole toward said load acting plane.

6. A suspension arm according to claim 1, the first wall having a top face, wherein the top face of said first wall extends in parallel with said load acting plane.

7. A suspension arm according to claim 1, wherein each of said side walls includes a side wall upper portion and a side wall lower portion, said side wall upper portion and said side wall lower portion of each sidewall being welded to each other, and the second walls defining an opening therebetween.

8. A suspension arm according to claim 7, wherein said side wall upper portion and said side wall lower portion, of each sidewall, have different thicknesses.

9. A suspension arm according to claim 7, wherein a weight reducing hole is formed in the first wall of said arm upper so as to reduce the weight of said arm body.

10. A suspension arm according to claim 1, wherein a projecting portion is provided at the first wall of said arm body such that said projecting portion projects opposite to the one direction.

11. A suspension arm according to claim 10, wherein a hole portion is formed in the projecting portion of said arm body, and the circumferential edge of said hole portion is bent toward the outside of said arm.

12. A suspension arm according to claim 1, wherein a hole portion is provided in the closed end of said arm body, and the circumferential edge of said hole portion is bent toward the outside of said arm.

13. A suspension arm according to claim 12, wherein the circumferential edge of said hole portion, which is bent toward the outside of said arm, is further bent toward the center of said hole portion so as to reduce the diameter of said hole portion.

14. A suspension arm according to claim 1, wherein the arm body has a substantially C-shaped open cross sectional configuration which is open toward the bottom, and wherein:
   a top face of the first wall extends in parallel with said load acting plane; and
   a projecting portion is provided at a portion of the upper face of the first wall such that said projecting portion projects upward so as to pass through said load acting plane.

15. A suspension arm according to claim 14, wherein a hole portion is formed in the projecting portion of said arm body, and a circumferential edge of said hole portion is bent toward an outside of the arm.

16. A suspension arm according to claim 1, wherein the first wall includes at least one hole.

17. A suspension arm, comprising:

an arm body having a first end, a second end, and an arm body portion connecting the first end and the second end, a portion of the arm body portion formed into an open cross sectional configuration of a substantially C-shape which is open in a downward direction, the cross sectional configuration including an upper wall having a flat portion and ending at end portions, side walls extending downwardly from each respective end portion of the upper wall and ending at lower portions, and lower walls extending inwardly from each respective lower portion of each side wall, the lower walls extending toward each other;

a connection point at a wheel at the first end of the arm body;

a connection point at a vehicle at the second end of the arm body; and a connection point at the vehicle connected to the arm body portion of the arm body;

wherein said connection points define a load acting plane through which a load acts on said suspension arm, said load acting plane passes through the upper wall of said arm body or exists above the upper wall of said arm body.

18. A suspension arm according to claim 17, wherein a pair of depressions for forming reinforcing ribs are provided at both sides of the upper wall of said arm body with spacing therebetween.

19. A suspension arm according to claim 17, the upper wall having a top face, wherein the top face of said upper wall extends in parallel with said load acting plane.

* * * * *